(12) United States Patent
Hsu et al.

(10) Patent No.: US 6,960,023 B2
(45) Date of Patent: Nov. 1, 2005

(54) BEARING STRUCTURE FOR BLADE ASSEMBLY OF COOLING FAN

(75) Inventors: Chung-Yung Hsu, Taoyuan (TW); Kuo-Ying Wu, Taoyuan (TW)

(73) Assignee: Tek-Chain Development Inc., Taoyuan (TW)

( * ) Notice: Subject to any disclaimer, the term of this patent is extended or adjusted under 35 U.S.C. 154(b) by 46 days.

(21) Appl. No.: 10/748,153

(22) Filed: Dec. 31, 2003

(65) Prior Publication Data

US 2005/0141794 A1    Jun. 30, 2005

(51) Int. Cl.[7] .............................................. F16C 23/04
(52) U.S. Cl. ...................... 384/125; 384/202; 384/446; 384/297
(58) Field of Search ............................... 384/125, 202, 384/446, 297, 276

(56) References Cited

U.S. PATENT DOCUMENTS 4,624,585 A * 11/1986 Nix et al. ................... 384/296
5,511,885 A *  4/1996 Coleman .................... 384/439

* cited by examiner

Primary Examiner—Lenard A. Footland
(74) Attorney, Agent, or Firm—Troxell Law Office, PLLC (57) ABSTRACT

A bearing for the blade assembly of the cooling fan, the bearing is made of the plastic steel material having an integrally formed cylindrical hollow body and outward extended large diameter seat. The seat bottom has a recess with screw thread cut along the inside wall. The bottom recess will receive a powerful magnet and a shield cap to cover. The hollow cylindrical body is a long accommodating cavity and extends upward to form a plurality of claws, each claw has a project point. The rotor shaft of the blade assembly will enter the accommodating cavity. The rotor shaft has a round groove to hold the project points of the claws in place. The rotor shaft is further attracted by the power magnet in the bottom recess so the rotor shaft is always kept along vertical center line, rotates in balance to achieve a stable floating rotation.

7 Claims, 8 Drawing Sheets

Prior Art

BEARING STRUCTURE FOR BLADE ASSEMBLY OF COOLING FAN

FIELD OF THE INVENTION

This invention is in particular concerning the moveable bearing for the blade assembly of the cooling fan.

BACKGROUND OF THE INVENTION

The prior art of bearing structure for the blade assemble of the cooling fan mainly consists of a bearing, an oil seal, a washer and a circlip. It usually takes a great lot of time, labor, material and cost to assemble. Under long time rotation, it is inevitable that the bearing will generate much noise, run unsmooth and shorten the service life. Now a magnetic levitation motor is introduced in an effort to reduce the parts and noise and to promote the precision and longer service life.

Figure 8:
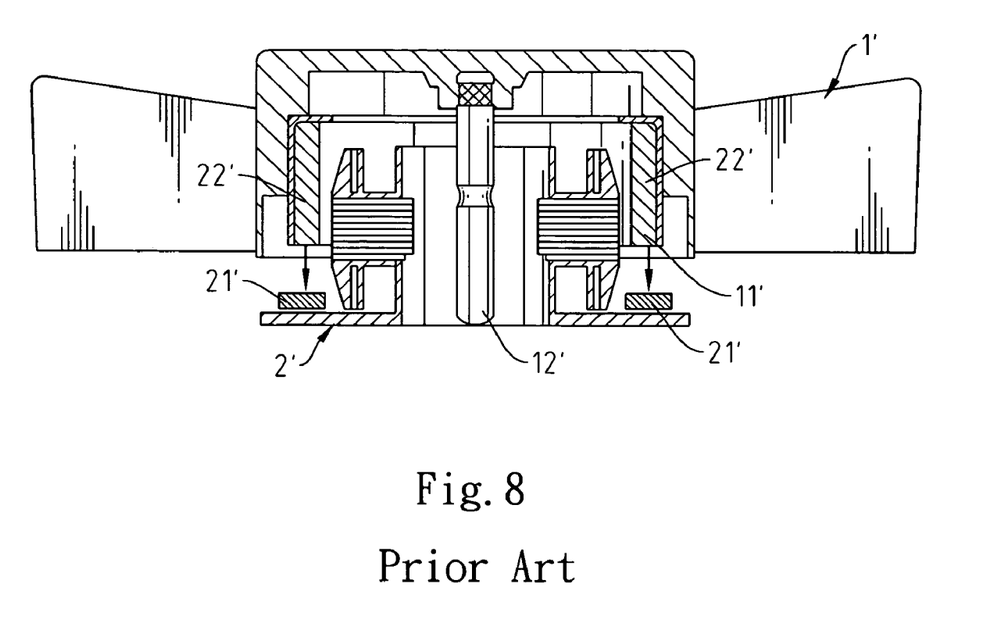
FIG. 8 shows the schematic diagram of conventional magnetic levitation motor for the cooling fan.

FIG. 8 shows a magnetic levitation motor used on the cooling fan. Technically, the blade 1' has a recess to receive the magnet 11' and the circuit board 2' on which a magnetic levitator 21' is mounted to produce an angle of 90° vertical magnetic levitation attraction as the arrow indicates and the blade 1' is therefore attracted. The rotor winding 22' and the magnet 11' will induce a magnetic rotation forcing the blade 1' and the rotor shaft 12' to make a suspending rotation in the space. The magnetic levitation motor has broken the bottleneck inhered in the conventional motor and overcome the noise, abrasion and short service life.

However, the magnetic levitation motor mounted on the cooling fan presents a low yield rate in production because the blade 1' and the magnetic levitator 21' must be disposed at 90 degree, if the degree is deflection, the blade 1' will not be rotating smooth. So, the magnetic levitator 21' must be places in exact parallel to the magnet 11', relatively, the rotor shaft 12' of the blade 1'when inserted must be kept in parallel with magnet 11' and the magnetic levitator 21'. Because of the high precision in assembly, the lows yield rate hurts the production.

SUMMARY OF THE INVENTION

The inventor has known well about the criticality of the cooling fan, learned how to improve the definite defects existing in prior art of cooling fan and worked for years to come up with the novel bearing structure for the blade assembly of the cooling fan.

The magnetic levitation motor concept is applied in order to keep the advantages of low noise, least parts, durability and long service life.

This invention made several improvements in the existing magnetic levitation motor where the circuit board 2' and the magnetic levitator 21' are removed. The ball bearing for the rotor shaft is replaced with a plastic steel bearing in which a powerful magnet is placed in the recess of bearing bottom, so the rotor shaft is always attracted to rotate along vertical center line regardless what angle the blade assembly is running. The rotor shaft and the bearing maintain a fixed race so there will never be noise and abrasion. The rotor shaft runs in the suspension manner, even under high speed, the rotor shaft is always vertical to ground. This is the basic theory this invention has adopted the magnetic levitation motor.

This invention made a further technical innovation from the magnetic levitation motor for the cooling fan. The invention eliminating the magnetic levitator 21' from the circuit board 2', and inserting the plastic steel bearing in the place of ball bearing and adding a powerful magnet at the bottom recess of the bearing. The rotor shaft, while attracted by the magnet, will rotate along the vertical center. The rotor shaft also keeps a fixed race with the bearing so the rotor shaft runs in the suspended manner without generation of friction and noise. This is the basic theory this invention has improved the magnetic levitation motor for the cooling fan.

This invention further achieves easy production and assembly and high yield rate. It is well known that the magnet is vital to the smooth operation of the cooling fan. In this invention, the magnet is the last piece to be inserted into the bearing after other parts have been already assembled, it is easy to insert the magnet after the post assembly, comparatively, much easier that the operation to install the magnetic levitator 21'on the circuit board 2'. This modified assembly procedure greatly increases the yield rate.

Furthermore, to replace the ball bearing with the plastic steel bearing offers the following advantages:

1. Easy production—it is a simple design and one shot formation.
2. Lightweight—the plastic steel material is lighter than the steel.
3. No lubricant—it is designed to use the self-lubricant plastic steel material.
4. Low noise—the plastic steel bearing is designed with high precision, durable material, which generates relatively low noise.
5. Long service life—high strength plastic steel material is used to gain the longer service life.
6. Easy assembly—the plastic steel bearing is an integrally formed, easy for assembly and disassembly.
7. Easy maintenance—a special plastic steel material is used for bearing, no lubrication and no corrosion at all.
8. Low production cost—it is design for an integral formation, comparing with the ball bearing, it save ¾ in parts, ⅔ in labor in the automatic production.

DETAIL DESCRIPTION OF THE INVENTION

Please refer to FIGS. 1 through 7; the bearing structure of this invention is a plastic steel bearing 1, which is formed integrally with a hollow cylindrical body 10 and a large diameter seat 14 at the bottom end. The seat 14 has a recess 141 with threaded wall. The recess will receive the powerful magnet 15 and the shield cap 3. The body 10 is a hollow cavity 11 with a plurality of extended claws 12. Each claw 12 has an inward project point 13.

The seat 14 has a skew conical border with small diameter at the lower end and large diameter at the upper end.

Figure 6:
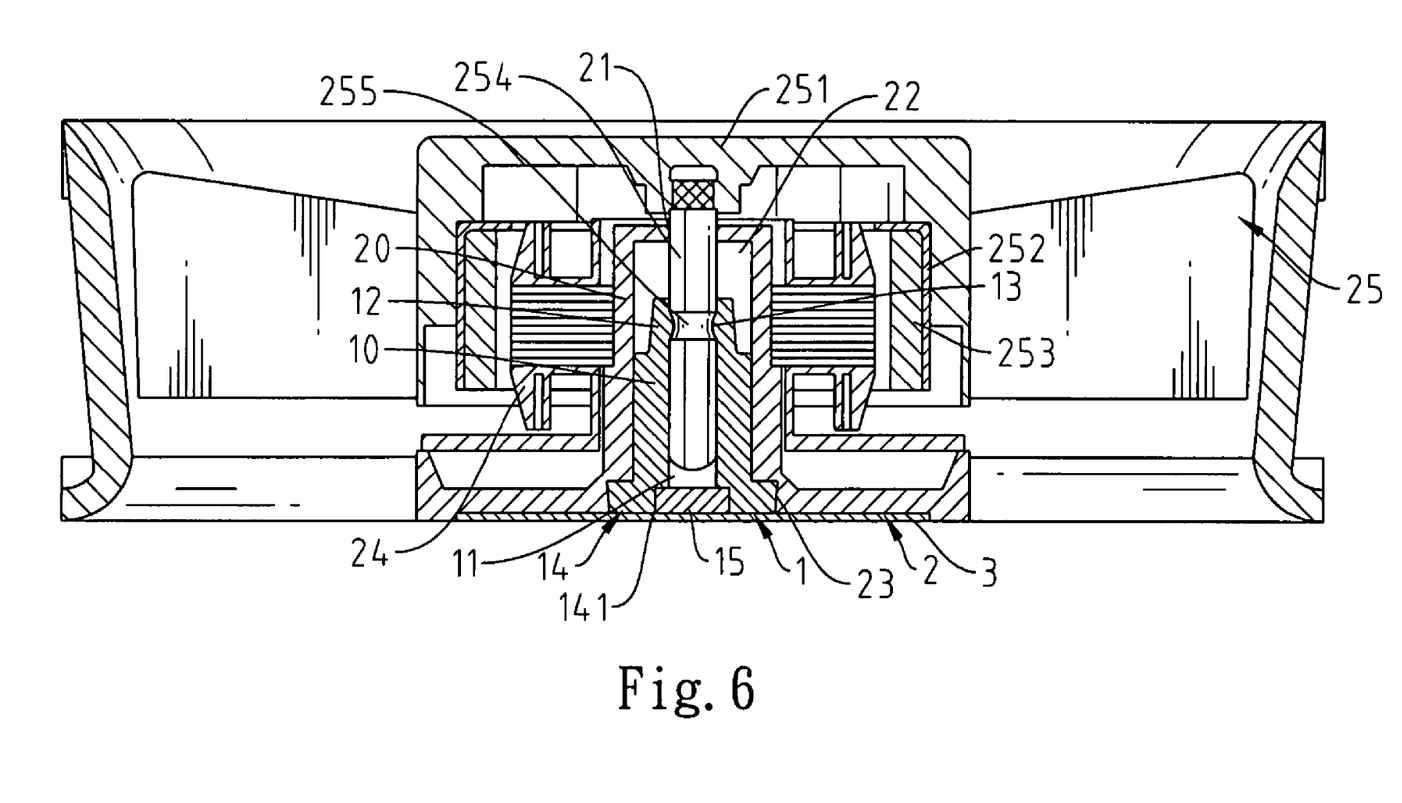
FIG. 6 shows another embodiment of the blade assembly of this invention.

The cavity 11 is a blind hole with a closure at the face of the seat 14. The cavity 11 can a go-through hole connected with recess 141 as shown in FIG. 6. That is to say the powerful magnet 15 is exposed to the bottom of cavity 11.

The body 10 has a plurality of claws 12 extended upward but less diameter.

Followed is the detail description of this invention.

Figure 5:
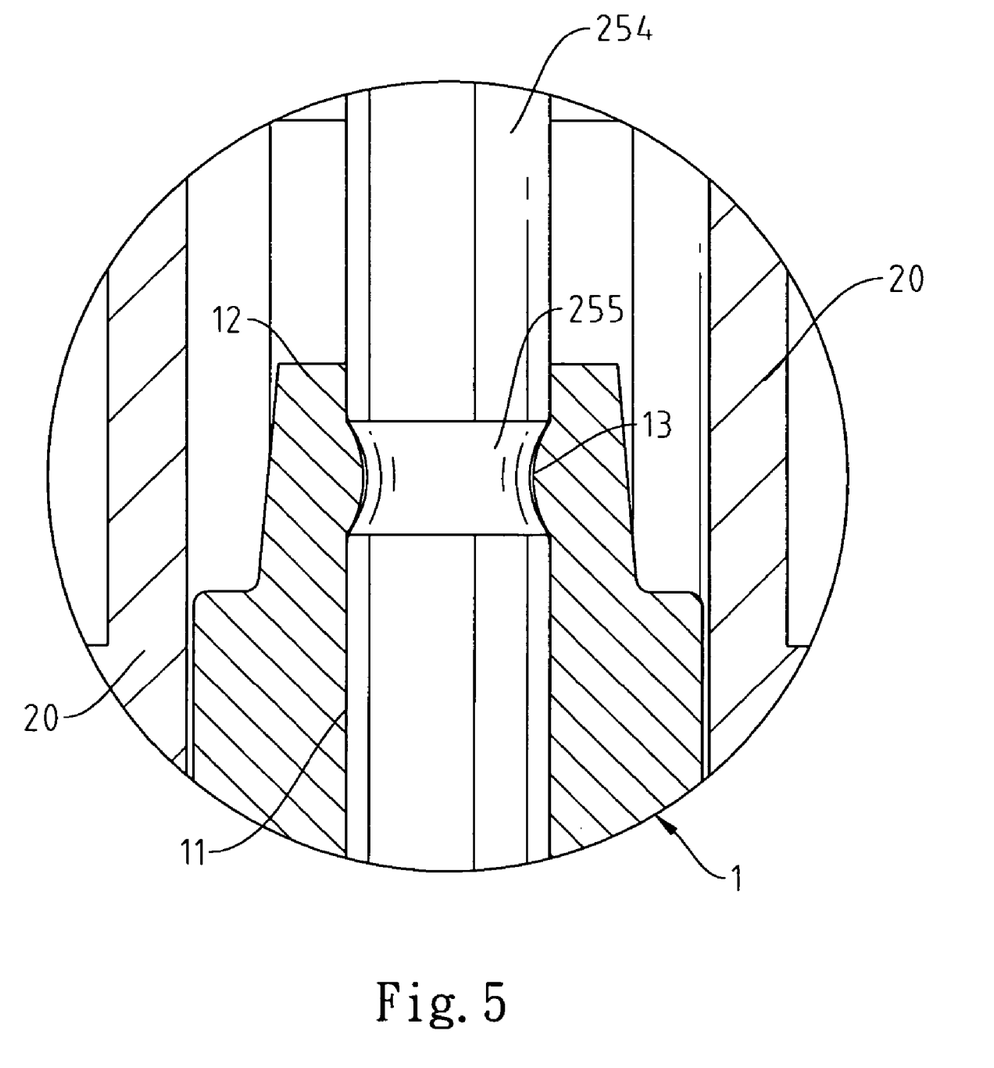
FIG. 5 shows the enlarged section of the blade assembly of this invention.

The base 2 of the blade assembly has a sleeve 20 with a top boring 21. The sleeve 20 has content space 22 and inverted groove 23. The inverted groove 23 has a small mouth but a large belly to compensate the skew conical border of the seat 14. Around the sleeve 20, there is a rotor winding 24. The center bottom of hub 251 of the blade 25 installed a rotor shaft 254 and the motor casing 252 around the inner wall of hub 251 where the permanent magnet 253 is installed. The rotor shaft 254 has a center groove 255 where the project point 13 of the claws 12 will rest.

Figure 1:
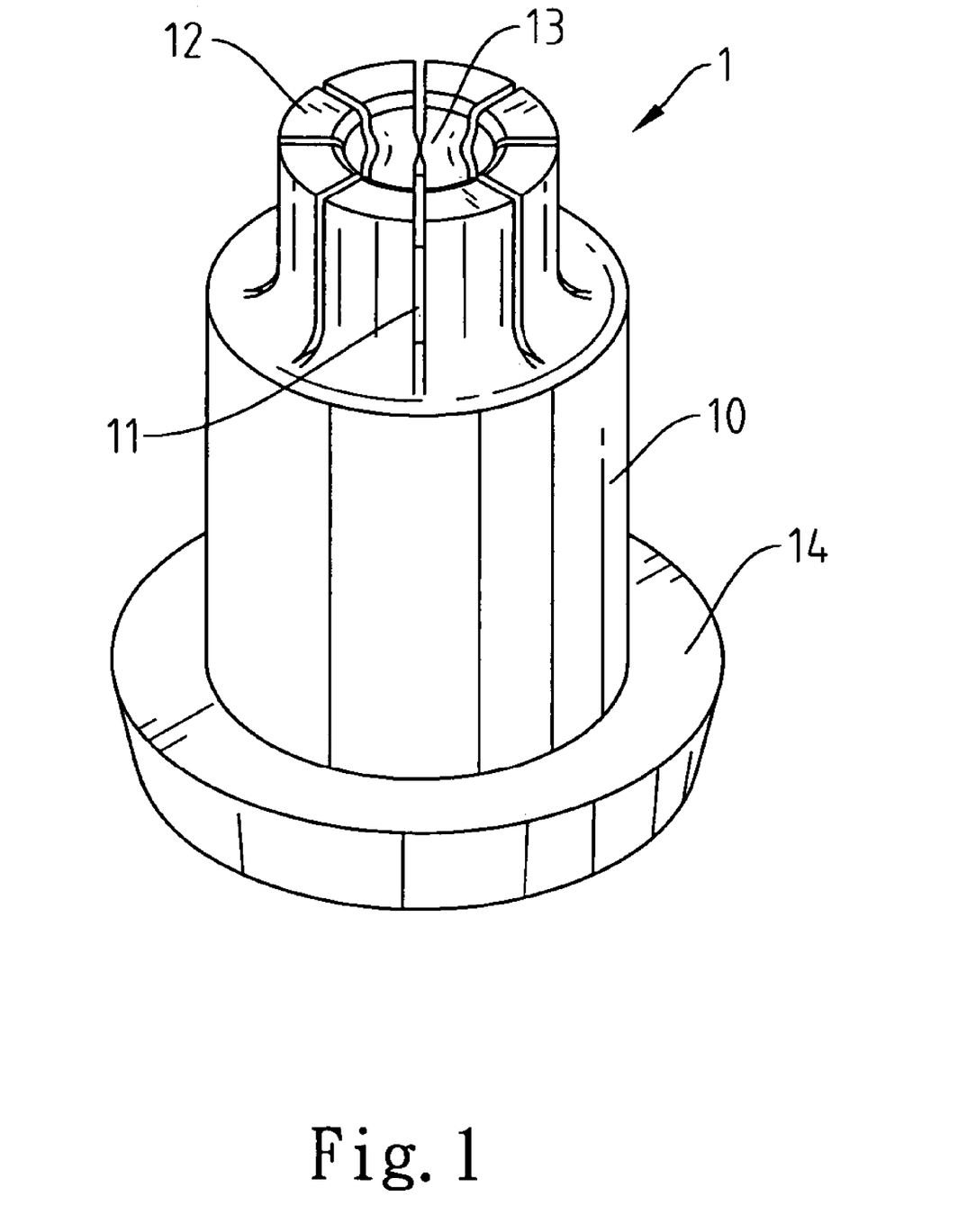
FIG. 1 is the outlook of the bearing structure of this invention.
Figure 2:
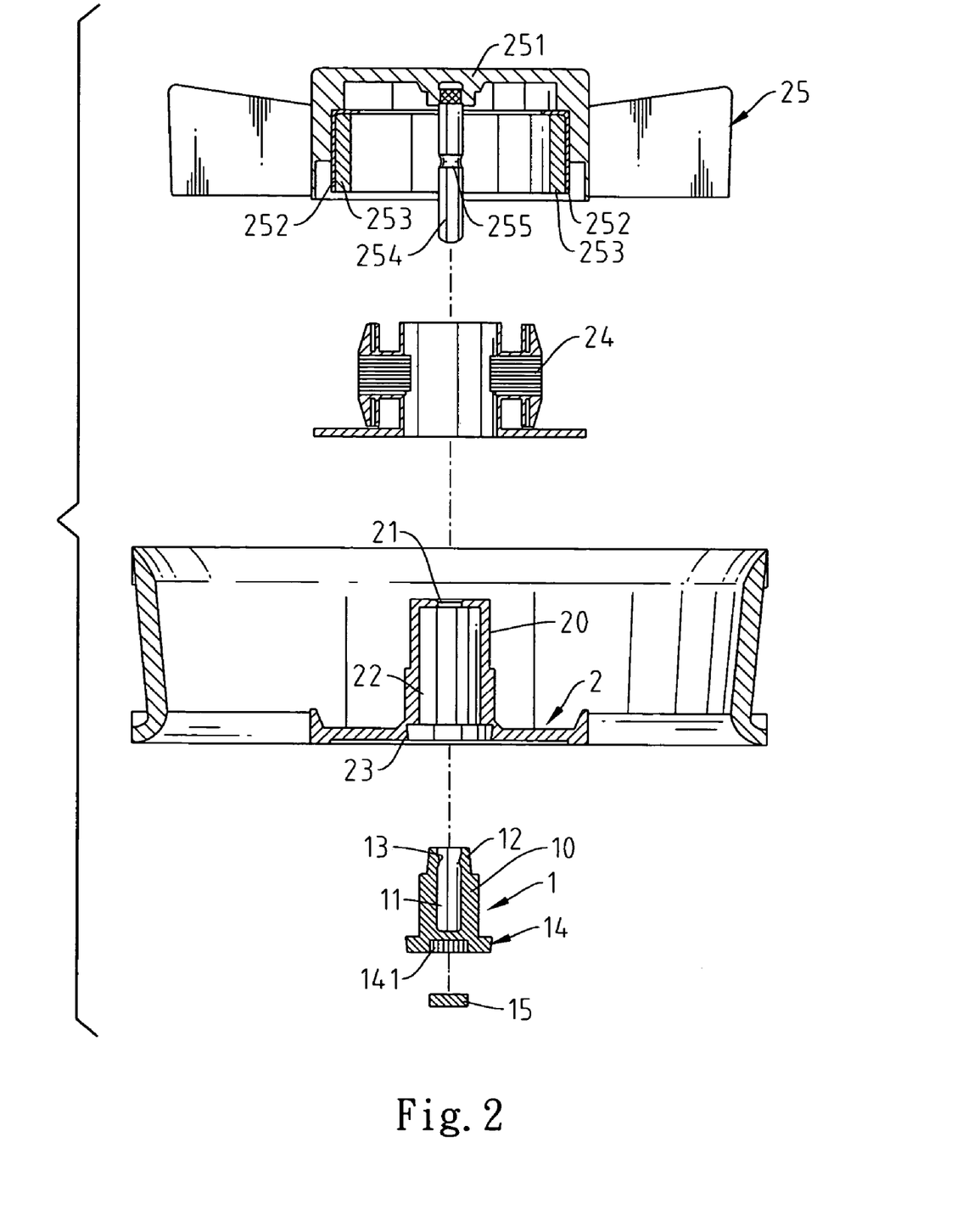
FIG. 2 shows the disassembly of the bearing structure embodiment as shown in FIG. 1.
Figure 3:
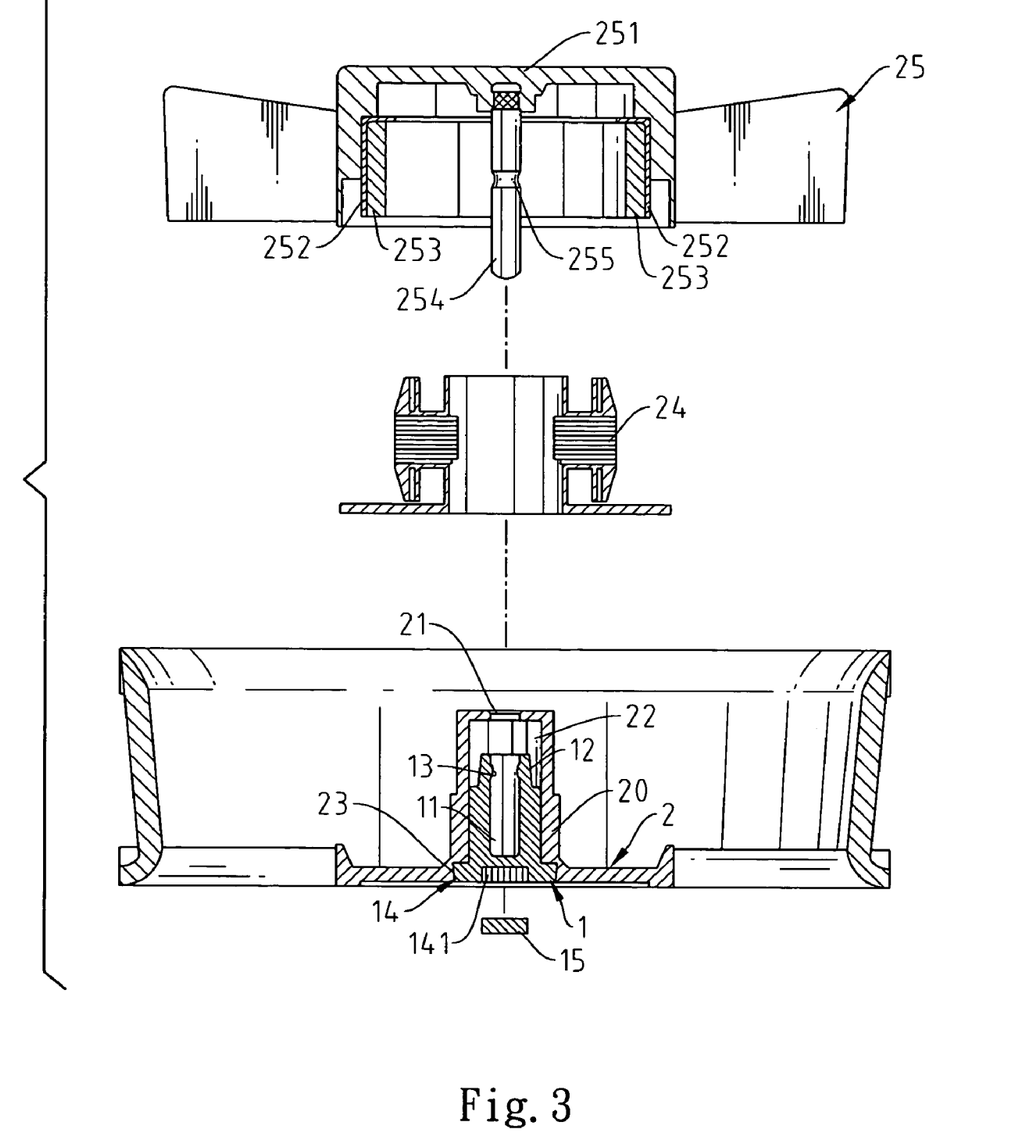
FIG. 3 shows the disassembly of the bearing structure embodiment as shown in FIG. 2.

As shown if FIGS. 2 and 3, in the process of assembly, the bearing 1 is pressed with force into the sleeve 20 of the base 2 so the conical body 10 is held in the content space 22 of the sleeve 20. The seat 14 is forced into the inverted groove 23 of the base 2, and buckled with the inverted groove 23.

Figure 4:
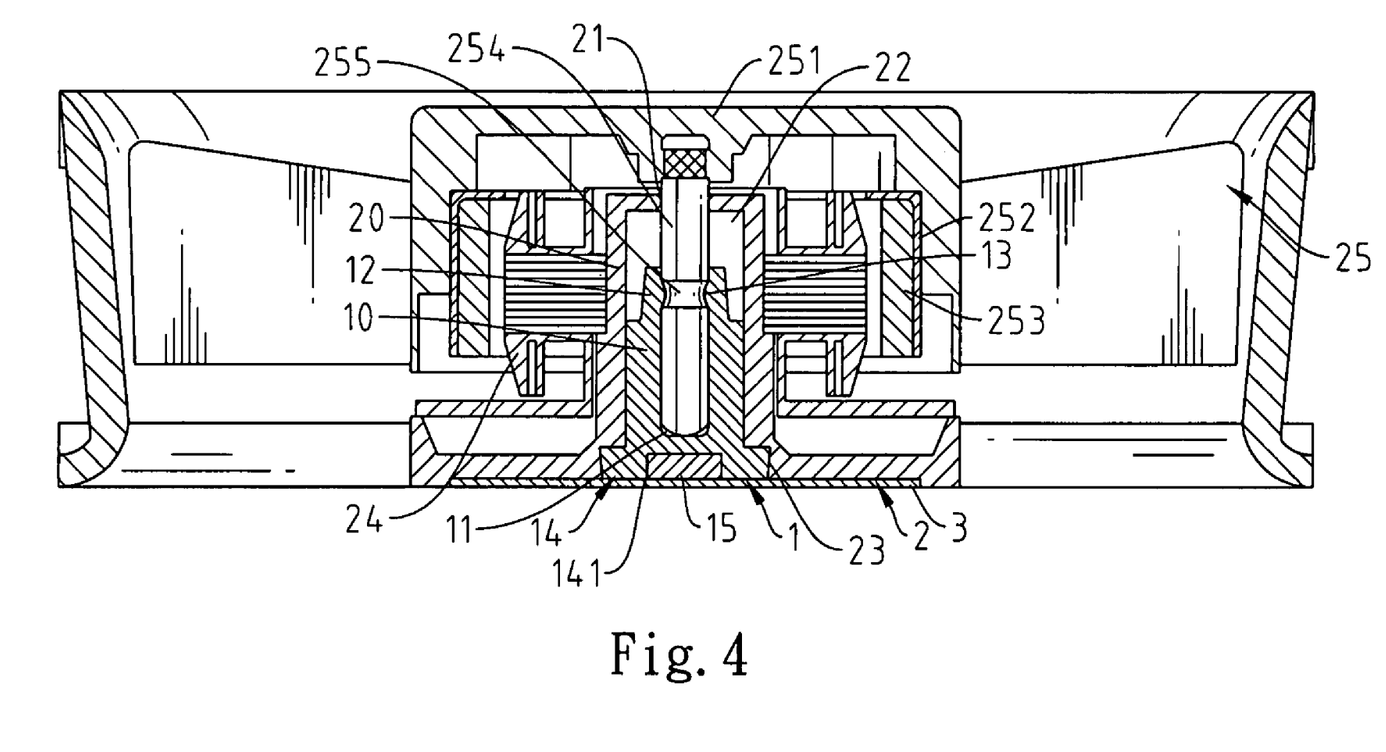
FIG. 4 shows the section of the bearing structure embodiment of this invention.

As shown in FIGS. 3 and 4, the rotor winding 24 encircles the sleeve 20. The rotor shaft 254 of the blade 25 enters the cavity 11 of the bearing 1 and forces the claws 12 extending outward until the project point 13 of the claws 12 buckles the inverted groove 255 of the rotor shaft 254.

There remains a clearance of 0.1 mm between the round groove 255 and the project point 13 of the claws 12. After the powerful magnet 15 is housed in the recess 141 of the seat 14 and closed with the shield cap 3. It will act as a magnetic levitator. Comparing the conventional magnetic levitator with the design of this invention, it offers great ease in assembly, high yield rate in fabrication, and benefit for mass production.

When the electric power is connected, the rotor winding 24 will excites the magnetic power which will repulse the magnetic line of the permanent magnet 253 contained in the hub 251 of the blade 25, this repulsive power causes the blade 25 to rotate. Since there is 0.1 mm clearance left between the project point 13 of the claws 12 and the round groove 255, the blade 25 is allowed to float up and down when rotating. Because the powerful magnet 15 along the vertical line in the cavity 11 persistently attracts the rotor shaft 254 of the blade 25, the rotor shaft 254 always attains a self-adjusted balance in rotation. Furthermore, the rotor shaft also keeps a small gap from the bearing 1, there will be no friction and noise generated. That is to say the rotor shaft 254 is always rotating in the suspended manner in air, the problems of many parts, high noise; easy wear and short service life which are born with the conventional magnetic levitation motor are hereby eliminated for good.

Figure 7:
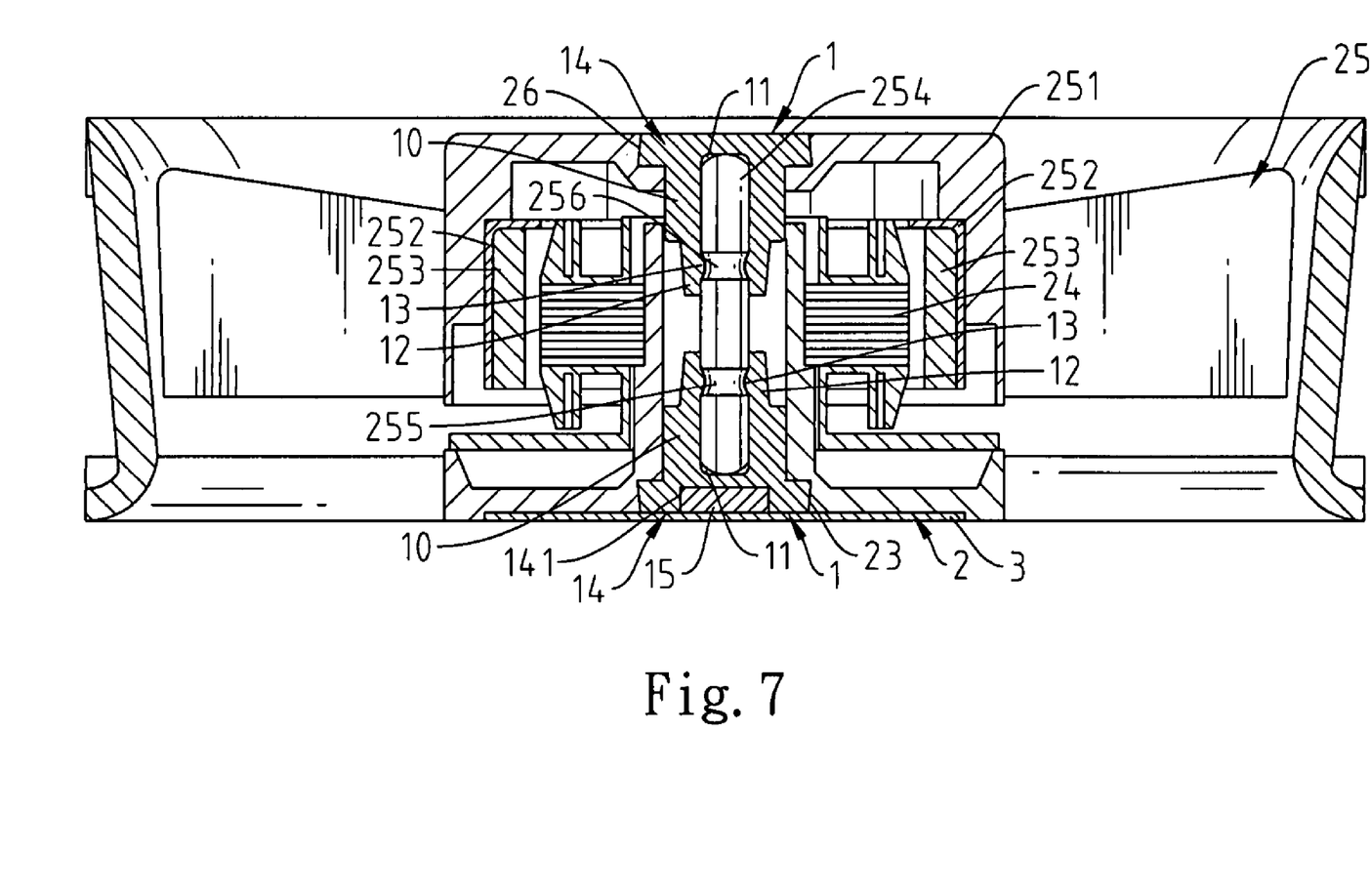
FIG. 7 shows another embodiment of the blade assembly of this invention.

The above description tells the embodiment of one bearing 1 being housed in the base 2. As shown in FIG. 7, there are two pieces of bearing 1 installed in the hub 251 of the blade 25, in which, the seat 14 of one bearing 1 is designed with closed end, the other seat 14 has a recess 141 to receive the powerful magnet 15.

The skew conical end of the seat 14 will be forced to insert into the inverted groove 26 of the hub 251. In this embodiment, the two ends of the rotor shaft 254 will enter each cavity 11 of two bearing 1 and has two round grooves 255, 256 to receive the project point 13 of claws 12 from two bearing 1.

The bearing structure for the blade assembly of the cooling fan as described in this invention provides a simple precise and durable bearing, designed with the attractive force of the magnet, enables the rotor shaft to attain self-adjustment and rotation along the vertical center line under suspended manner. This design ensures self-lubrication low friction and noise benefit for easy production and assembly, much better than the conventional cooling fan.

What is claimed is:

1. A bearing for the blade assembly of a cooling fan, the bearing is made of steel material having an integrally formed cylindrical hollow body and outward extended large diameter seat, the said seat has a recess with threaded wall on the bottom for housing a powerful magnet, the body has a cavity which extends upward to form a plurality of claws with project point at the claw tip, the said bearing will be inserted in the hub of the blade assembly and the rotor shaft is held in the cavity of the bearing and the project point of the claws will catch the round grove on the rotor shaft; when the magnet is attracting the rotor shaft, the rotor shaft keeps a vertical line in cavity to gain a self-adjusting balance and rotation in the suspended manner.

2. The bearing structure for the blade assembly of the cooling fan as claimed in the claim 1 in which the seat has skew conical bevel with a diameter larger than the body.

3. The bearing structure for the blade assembly of the cooling fan as claimed in the claim 1 in which the body extends upward to form a plurality of claws but with smaller diameter than the body.

4. The bearing structure for the blade assembly of the cooling fan as claimed in the claim 1 in which the cavity is a blind hole having a closure on the seat.

5. The bearing structure for the blade assembly of the cooling fan as claimed in the claim 1 in which the cavity has a hole linked to the recess and the magnet contained in the recess exposes to the cavity.

6. The bearing structure for the blade assembly of the cooling fan as claimed in the claim 1 in which the width of the round grove on the rotor shaft is wider than the width of project point of the claw.

7. The bearing structure for the blade assembly of the cooling fan as claimed in the claim 1 in which the project point of the claws is aligned to the center of round groove and there is a clearance of 0.1 mm between the project point and the center of the round groove.

* * * * *